UNITED STATES PATENT OFFICE.

ALBERT BERTSCHMANN, OF BASLE, SWITZERLAND, ASSIGNOR TO THE SOCIETY OF CHEMICAL INDUSTRY IN BASLE, OF SAME PLACE.

SULFURIZED INDOPHENOL DYE AND PROCESS OF MAKING SAME.

SPECIFICATION forming part of Letters Patent No. 665,726, dated January 8, 1901.

Application filed September 4, 1900. Serial No. 28,989. (Specimens.)

*To all whom it may concern:*

Be it known that I, ALBERT BERTSCHMANN, a citizen of the Swiss Republic, and a resident of Basle, Switzerland, have invented a new Sulfurized Indophenol Dyestuff and a Process for its Manufacture, of which the following is a clear and complete specification I have found that contrary to the process hitherto employed for the production of sulfurized coloring-matter dyeing non-mordanted cotton—that is to say, the so-called "Vidal" process, which consists in melting different organic compounds with alkali sulfids and sulfur—new coloring-matters of great purity and great beauty may be obtained by treating derivatives of paraoxydialphylamins with sodium tetrasulfid or other polysulfids in presence of different organic solvents and avoiding as much as possible all presence of water.

My process for the manufacture of sulfurized coloring-matters has hitherto been applied with advantage to bodies which furnish leuco-indophenols by reduction—that is to say, derivatives of nitroparaoxydialphylamins and amidoparaoxydialphylamins, as well as corresponding derivatives of indophenols and quinonimids. Thus the process is adapted to the manufacture of sulfurized coloring-matters, which, according to their production and properties, should be considered hydrosulfids or disulfids of sulfurized indophenols.

To carry out my invention, I proceed generally as follows: In an autoclave containing alcohol or another organic solvent I introduce one of the foregoing-named compounds—sodium tetrasulfid or another polysulfid—and I heat the mixture with or without addition of various inorganic or organic bodies, as ammonia, caustic soda, anilin, sulfanilic acid, &c., at the temperature which is necessary for the formation of the desired dyestuff. After cooling the greatest part of the new coloring-matters formed separates directly in crystalline condition when alcohol is employed as solvent, while the other part of the coloring-matters rests dissolved in the alcoholic solution and may be isolated by evaporating the alcohol. These latter coloring-matters are also sulfurized compounds, dyeing unmordanted cotton most in greenish tints and are preferably mixed with bluish dyes for their employ in dyeing. While the coloring-matters are being isolated the crystalline mass becomes heated because there is simultaneous oxidation. This oxidation produces a change of the tint in which these coloring-matters dye to deep blue or violet, which change may be favored by an addition of an oxidizing agent, as hydrogen peroxid, ozone, &c., or by different vehicles of oxygen.

For the manufacture of a sulfurized coloring-matter dyeing unmordanted cotton in bluish tints from 2.4-dinitro-4-oxy-diphenylamin melting at 198° to 199° centigrade I proceed, for instance, in the following manner: Ten parts of 2.4-dinitro-4-oxy-diphenylamin are heated in an autoclave with eighteen parts sodium tetrasulfid (as much as possible free from water) and fifty to eighty parts alcohol to a temperature of about 145° for three to five hours. After cooling the coloring-matter may be isolated by distilling off the alcohol, or the coloring-matter, separated in the form of crystals with coppery luster, is freed by filtration from the mother-liquor and the alcohol distilled off from this latter. In the first case—that is to say, directly by distilling off the alcohol—a mixture of bluish dyestuff and of a greenish dyestuff is obtained in the form of a product dyeing non-mordanted cotton deep black, while in the second case both dyestuffs are obtained separated.

The part which is separated as crystals of coppery luster dyes non-mordanted cotton in a bath containing sodium-sulfid shades, which in tints of two per cent. are deep-blue violet and by subsequent oxidation on the fiber become violet blue and in tints of five per cent. are violet black blue shaded with brown or green. These latter tints produce deep black. The second dyestuff, which is isolated from the filtrate by distilling off the alcohol, dyes non-mordanted cotton in green-black tints and is especially adapted for shading blue dyestuffs.

By treating the first dyestuff with air or oxygen alone or in presence of vehicles of oxygen or with other oxidizing agents, as hydrogen peroxid, ozone, persulfate, percarbonate, &c., the shade of the said dyestuff turns to reddish blue or volet-blue.

Instead of 2.4-dinitro-4-oxy-diphenylamin other substituted paraoxy derivatives, as paraoxynitroamidodiphenylamin or paraoxy diamidodiphenylamin, the corresponding indophenols and quinonimid derivatives, and their reduction products may be employed without essential alteration of the result.

The dyestuff which is derived from 2.4-dinitro-4-oxy-diphenylamin and forms the main product of reaction is a deep-blue crystalline powder with coppery luster and is soluble in alkali sulfids with blue-violet color. It is essentially different from the dyestuff described in Letters Patent No. 610,541 and derived from 2.4-dinitro-4-oxydiphenylamin according to the Vidal process.

What I claim is—

1. The process for the manufacture of sulfurized dyestuffs, dyeing non-mordanted cotton, by treating paraoxydialphylamin derivatives with alkaline polysulfids, in presence of organic solvents, as described.

2. The process for the manufacture of sulfurized dyestuffs, dyeing non-mordanted cotton, by treating paraoxydialphylamin derivatives with alkaline polysulfids, in presence of organic solvents and treating the dyestuffs thus obtained with weak oxidizing agents.

3. The process for the manufacture of a sulfurized dyestuff, dyeing non-mordanted cotton violet blue to black blue by heating 2.4-dinitro-4-oxy-diphenylamin with tetrasulfid under pressure in presence of alcohol and separating, after cooling, by filtration, the crystalline dyestuff from the mother-liquor.

4. As a new article of manufacture, the herein-described dyestuff, which is, in dry state, a crystalline, deep-blue powder with coppery luster, soluble in alkali sulfids with reddish-blue coloration and dyeing non-mordanted cotton in solutions containing alkali sulfids violet-blue to black-blue shades.

In witness whereof I have hereunto signed my name, this 17th day of August, 1900, in the presence of subscribing witnesses.

ALBERT BERTSCHMANN.

Witnesses:
 CLARENCE GIFFORD,
 GEO. GIFFORD,
 AMAND RITTER.